(12) United States Patent
Bordin (10) Patent No.: US 9,726,383 B1
(45) Date of Patent: Aug. 8, 2017

(54) SUPPORT FOR RADIANT COVERING AND FLOOR HEATING ELEMENTS

(71) Applicant: Progress Profiles S.p.a., Asolo (TV) (IT)

(72) Inventor: Dennis Bordin, Asolo (IT)

(73) Assignee: PROGRESS PROFILES S.P.A. (IT)

( * ) Notice: Subject to any disclaimer, the term of this patent is extended or adjusted under 35 U.S.C. 154(b) by 0 days.

(21) Appl. No.: 15/185,576

(22) Filed: Jun. 17, 2016

(51) Int. Cl.
| | |
|---|---|
| *F24D 3/14* | (2006.01) |
| *F24D 3/12* | (2006.01) |
| *F24D 13/02* | (2006.01) |
| *H05B 3/28* | (2006.01) |
| *F24D 3/02* | (2006.01) |

(52) U.S. Cl.
CPC .............. *F24D 3/142* (2013.01); *F24D 3/12* (2013.01); *F24D 3/141* (2013.01); *F24D 13/024* (2013.01); *H05B 3/28* (2013.01); *Y02B 30/26* (2013.01)

(58) Field of Classification Search
CPC .......... F24D 13/024; F24D 3/141; F24D 3/12; F24D 19/0213; Y02B 30/26; E04B 5/48; H05B 3/28; E04F 15/18
USPC ...... 236/69, 59, 56, 8 A; 52/220.1; 138/177; 165/49, 50, 47, 48.1, 53, 56; 219/213; 432/31
IPC ........... F24D 3/16,3/14, 3/12, 3/02; E04B 5/48
See application file for complete search history.

(56) References Cited

U.S. PATENT DOCUMENTS

| | | | | |
|---|---|---|---|---|
| 254,269 | A | * | 2/1882 | Riehl .................... E01C 5/00 404/34 |
| 1,485,370 | A | * | 3/1924 | Cumfer ................ E04F 13/04 52/446 |
| 1,549,773 | A | | 8/1925 | Hynes |
| 2,139,512 | A | | 12/1938 | Nagorny |
| 2,956,785 | A | * | 10/1960 | Richl ..................... F24D 5/10 165/56 |
| 3,135,040 | A | | 6/1964 | Watson |
| 3,235,712 | A | | 2/1966 | Watson |
| 3,434,401 | A | | 3/1969 | Kiewit |
| 3,487,579 | A | | 1/1970 | Brettingen |
| 3,597,891 | A | | 8/1971 | Martin |
| 3,695,615 | A | | 10/1972 | Shoptaugh |
| 3,757,481 | A | | 9/1973 | Skinner |
| 4,016,692 | A | | 4/1977 | Jordan et al. |
| 4,183,167 | A | | 1/1980 | Jatich |
| 4,250,674 | A | * | 2/1981 | Feist .................... E04B 5/48 52/220.3 |
| 4,326,366 | A | | 4/1982 | Werner |

(Continued)

FOREIGN PATENT DOCUMENTS

| | | | | |
|---|---|---|---|---|
| AT | EP 0189020 | A1 | * 7/1986 | ............ F24D 3/142 |
| CA | 1186470 | | 5/1985 | |

(Continued)

OTHER PUBLICATIONS

"EP_60547_A1_I—Machine Translation.pdf", Machine translation for EP-60547-Al, EPO, Aug. 19, 2016.*

(Continued)

*Primary Examiner* — Gregory Huson
*Assistant Examiner* — Daniel E Namay
(74) *Attorney, Agent, or Firm* — Sheridan Ross P.C.

(57) ABSTRACT

A support for the heating elements of radiant coverings and floors includes bosses having a concave surface. In some examples, the concave surface includes at least one adhering low relief that creates an extraction-preventing undercut on the concave surface.

20 Claims, 5 Drawing Sheets

(56) References Cited

U.S. PATENT DOCUMENTS

| | | | |
|---|---|---|---|
| 4,338,994 A | 7/1982 | Hewing et al. | |
| 4,576,221 A * | 3/1986 | Fennesz | F24D 3/14 |
| | | | 165/168 |
| 4,640,067 A * | 2/1987 | Hagemann | F24D 3/142 |
| | | | 52/220.3 |
| 4,640,854 A | 2/1987 | Radtke | |
| 4,923,733 A | 5/1990 | Herbst | |
| 4,995,471 A | 2/1991 | Hara et al. | |
| 4,997,308 A | 3/1991 | Welling, Jr. | |
| 5,042,569 A * | 8/1991 | Siegmund | F24D 3/143 |
| | | | 165/49 |
| 5,052,161 A | 10/1991 | Whitacre | |
| 5,078,203 A | 1/1992 | Shiroki | |
| 5,105,595 A | 4/1992 | Tokei et al. | |
| 5,131,458 A | 7/1992 | Bourne et al. | |
| 5,374,466 A | 12/1994 | Bleasdale | |
| 5,386,670 A * | 2/1995 | Takeda | E04F 15/02411 |
| | | | 52/126.6 |
| 5,447,433 A | 9/1995 | Perry, Jr. | |
| 5,480,259 A | 1/1996 | Thrower | |
| 5,499,476 A | 3/1996 | Adams et al. | |
| D370,034 S | 5/1996 | Kipfer | |
| D372,158 S | 7/1996 | Bonaddio et al. | |
| 5,585,154 A | 12/1996 | Rhoades | |
| 5,789,462 A | 8/1998 | Motani et al. | |
| 5,863,440 A | 1/1999 | Rink et al. | |
| 6,076,315 A | 6/2000 | Kondo | |
| 6,094,878 A * | 8/2000 | Schluter | F24D 3/142 |
| | | | 52/220.3 |
| 6,178,662 B1 | 1/2001 | Legatzke | |
| 6,434,901 B1 * | 8/2002 | Schluter | E02D 5/801 |
| | | | 52/302.1 |
| 6,805,298 B1 | 10/2004 | Corbett | |
| 6,918,217 B2 | 7/2005 | Jakob-Bamberg et al. | |
| D508,332 S | 8/2005 | Julton | |
| D541,396 S | 4/2007 | Fawcett et al. | |
| 7,250,570 B1 * | 7/2007 | Morand | F24D 3/141 |
| | | | 174/135 |
| D551,152 S | 9/2007 | Funk et al. | |
| D568,006 S | 4/2008 | Shin | |
| D587,358 S | 2/2009 | Stephan et al. | |
| 7,585,556 B2 * | 9/2009 | Julton | E04F 13/04 |
| | | | 405/36 |
| 7,669,371 B2 | 3/2010 | Hill | |
| 8,002,241 B1 | 8/2011 | Shaw | |
| 8,020,783 B2 * | 9/2011 | Backman, Jr. | F24D 3/142 |
| | | | 165/56 |
| 8,176,694 B2 * | 5/2012 | Batori | E04F 15/18 |
| | | | 52/220.2 |
| 8,288,689 B1 * | 10/2012 | Adelman | H05B 3/146 |
| | | | 219/200 |
| 8,573,901 B2 | 11/2013 | De Souza Filho et al. | |
| D706,459 S | 6/2014 | Schluter et al. | |
| D712,159 S | 9/2014 | Clerici et al. | |
| 8,950,141 B2 | 2/2015 | Schluter et al. | |
| 9,188,348 B2 * | 11/2015 | Larson | F24D 13/024 |
| D747,503 S | 1/2016 | Reynolds et al. | |
| 9,275,622 B2 | 3/2016 | Claeys et al. | |
| 9,284,693 B2 | 3/2016 | Tabibnia | |
| 9,328,520 B1 * | 5/2016 | Kriser | E04F 15/182 |
| 9,416,979 B2 * | 8/2016 | Larson | F24D 3/141 |
| 2005/0184066 A1 | 8/2005 | Brooks et al. | |
| 2006/0260233 A1 | 11/2006 | Schluter | |
| 2006/0265975 A1 | 11/2006 | Geffe | |
| 2006/0278172 A1 | 12/2006 | Ragonetti et al. | |
| 2007/0056233 A1 | 3/2007 | Kang et al. | |
| 2008/0017725 A1 * | 1/2008 | Backman, Jr. | F24D 3/142 |
| | | | 237/69 |
| 2008/0173060 A1 * | 7/2008 | Cymbalisty | B01F 5/0646 |
| | | | 72/369 |
| 2008/0276557 A1 * | 11/2008 | Rapaz | E04B 5/026 |
| | | | 52/302.3 |
| 2008/0290503 A1 | 11/2008 | Karavakis et al. | |
| 2008/0290504 A1 * | 11/2008 | Karavakis | H01L 23/3737 |
| | | | 257/713 |
| 2008/0295441 A1 | 12/2008 | Carolan et al. | |
| 2009/0026192 A1 | 1/2009 | Fuhrman | |
| 2009/0217605 A1 * | 9/2009 | Batori | F24D 3/142 |
| | | | 52/220.2 |
| 2009/0230113 A1 | 9/2009 | Batori | |
| 2011/0047907 A1 * | 3/2011 | Smolka | F24D 13/024 |
| | | | 52/220.1 |
| 2014/0069039 A1 * | 3/2014 | Schluter | E04F 15/182 |
| | | | 52/390 |
| 2016/0010327 A1 * | 1/2016 | Larson | F24D 13/024 |
| | | | 52/220.1 |
| 2016/0033144 A1 * | 2/2016 | Larson | F24D 13/024 |
| | | | 248/49 |
| 2016/0047131 A1 * | 2/2016 | Larson | E04F 15/182 |
| | | | 52/173.1 |
| 2016/0061355 A1 * | 3/2016 | Sherman | F24D 13/02 |
| | | | 29/428 |
| 2016/0273232 A1 * | 9/2016 | Bordin | E04F 15/185 |
| 2016/0377299 A1 * | 12/2016 | Larson | F24D 13/02 |
| | | | 52/173.1 |

FOREIGN PATENT DOCUMENTS

| | | | | |
|---|---|---|---|---|
| CH | 657690 | | 9/1986 | |
| DE | 2840149 | | 3/1980 | |
| DE | EP 0060547 A1 * | | 9/1982 | F24D 3/142 |
| DE | 8413516 | | 10/1984 | |
| DE | 3317131 | | 11/1984 | |
| DE | EP 0133556 A2 * | | 2/1985 | E04B 5/48 |
| DE | 3730144 | | 4/1988 | |
| DE | 4201553 A1 * | | 11/1992 | F24D 3/142 |
| DE | EP 0514684 A1 * | | 11/1992 | F24D 3/142 |
| DE | 9114591 U1 * | | 3/1993 | E04F 15/02 |
| DE | 4230168 | | 8/1993 | |
| DE | 4226312 | | 2/1994 | |
| DE | 4242026 | | 6/1994 | |
| DE | 29609497 U1 * | | 8/1996 | E04F 15/18 |
| DE | 19750277 | | 5/1999 | |
| DE | 19828607 | | 12/1999 | |
| DE | 19936801 C1 * | | 8/2000 | F24D 3/142 |
| DE | 19912922 C1 * | | 1/2001 | F42D 3/141 |
| DE | 10040643 C1 * | | 11/2001 | F16L 3/26 |
| DE | 202006013453 | | 11/2006 | |
| DE | EP 1770337 A1 * | | 4/2007 | F24D 3/142 |
| DE | 102006004626 | | 8/2007 | |
| DE | 102006004755 A1 * | | 8/2007 | F24D 3/142 |
| EM | 001079214-0005 | | 3/2009 | |
| EP | 74490 | | 3/1983 | |
| EP | 133556 | | 2/1985 | |
| EP | 367176 | | 5/1990 | |
| EP | 368804 | | 5/1990 | |
| EP | 437999 | | 7/1991 | |
| EP | 0582031 | | 2/1994 | |
| EP | 947778 | | 10/1999 | |
| EP | 1054217 | | 11/2000 | |
| EP | 1068413 | | 1/2001 | |
| EP | 1074793 | | 2/2001 | |
| EP | 1338413 A1 * | | 8/2003 | B32B 3/28 |
| EP | 1063478 | | 10/2003 | |
| EP | 1208332 | | 3/2004 | |
| FR | 2695986 A1 * | | 3/1994 | F24D 3/142 |
| FR | 2746426 A1 * | | 9/1997 | F24D 3/142 |
| FR | EP 1096079 A1 * | | 5/2001 | F24D 3/142 |
| GB | 2006548 | | 5/1979 | |
| GB | 2097836 | | 11/1982 | |
| GB | 2364565 A * | | 1/2002 | F24D 3/142 |
| GB | 2373042 A * | | 9/2002 | F24D 3/142 |
| JP | H01-139935 | | 6/1989 | |
| JP | H05-264051 | | 10/1993 | |
| JP | 2008025295 A * | | 2/2008 | |
| KR | WO 2004111544 A1 * | | 12/2004 | F24D 3/141 |
| WO | WO 8203099 A1 * | | 9/1982 | E02D 31/02 |
| WO | WO 95/22671 | | 8/1995 | |
| WO | WO 2016036365 A1 * | | 3/2016 | F24D 13/024 |

(56) References Cited

FOREIGN PATENT DOCUMENTS

OTHER PUBLICATIONS

"EP_1770337—Machine Translation.pdf", Machine translation for EP1770337, EPO, Aug. 19, 2016.*
U.S. Appl. No. 29/493,206, filed Jun. 6, 2014, Larson.
U.S. Appl. No. 29/547,874, filed Dec. 8, 2015, Larson.
U.S. Appl. No. 15/070,960, filed Mar. 15, 2016, Bordin et al.
U.S. Appl. No. 29/573,009, filed Aug. 2, 2016, Bordin.
U.S. Appl. No. 15/260,848, filed Sep. 9, 2016, Larson.
U.S. Appl. No. 15/260,859, filed Sep. 9, 2016. Larson.
"5 Facts You May Not Know About Heated Flooring," southcypress.com, Sep. 12, 2015, 4 pages [retrieved Aug. 3, 2016 from: https://web.archive.org/web/20150912220312/http://www.southcypress.com/v3/articles/heated-flooring.htm].
"Ditra Heat," GlensFalls Tile & Supplies, Sep. 4, 2014, 1 page [retrieved Aug. 3, 2016 from: http://www.glensfallstile.com/general-tips/ditra-heat/772/].
"Illustrated price list BT 7," Schlüter-Systems KG, Dec. 7, 28 pages.
Schluter Systems, Profile of Innovation, Illustrated Price List, Jan. 1, 2008, 2 pages.
International Search Report and Written Opinion for International (PCT) Patent Application No. PCT/US2015/045688, mailed Nov. 12, 2015 9 pages.
Official Action for U.S. Appl. No. 12/550,111, mailed Apr. 26, 2013 12 pages.
Official Action for U.S. Appl. No. 12/550,111, mailed Dec. 5, 2013 14 pages.
Official Action for U.S. Appl. 12/550,111, mailed Jan. 23, 2015 16 pages.
Notice of Allowance for U.S. Appl. No. 12/550,111, mailed Aug. 28, 2015 11 pages.
Notice of Allowance for U.S. Appl. No. 12/550,111, mailed Sep. 22, 2015 10 pages.
Official Action for U.S. Appl. No. 29/493,206, mailed Aug. 10, 2016 8 pages.
Official Action for U.S. Appl. No. 29/547,874, mailed Aug. 10, 2016 8 pages.
Official Action for U.S. Appl. No. 14/860,065, mailed Mar. 15, 2016, 6 pages.
Third Party Submission for U.S. Appl. No. 14/860,065, mailed Apr. 28, 2016, 18 pages.
Notice of Allowance for U.S. Appl. No. 14/880,859, mailed Mar. 7, 2016, 16 pages.
Official Action for U.S. Appl. No. 14/829,108, mailed Jan. 20, 2016, 10 pages.
Third Party Submission for U.S. Appl. No. 14/829,108, mailed Aug. 17, 2016, 17 pages.
Official Action for U.S. Appl. No. 15/070,960, mailed Aug. 26, 2016 9 pages.
Polypipe Brochure; "Redefining Heating Systems," www.ufch.com; Polyplumb: Hot & Cold Plumbing & Heating System; © 2006, Polypipe Group; Printed: Feb. 2007, 44 pages.
Third Party Submission for U.S. Appl. No. 14/860,065, filed Jun. 23, 2016 25 pages.
Third Party Submission for U.S. Appl. No. 14/860,065, filed Jul. 8, 2016 26 pages.
Notice of Allowance for U.S. Appl. No. 14/860,065, mailed Sep. 14, 2016 10 pages.

\* cited by examiner

SUPPORT FOR RADIANT COVERING AND FLOOR HEATING ELEMENTS

CROSS-REFERENCE TO RELATED APPLICATIONS

This application claims the benefit of Italian Patent Application No. 102016000033439 filed Apr. 1, 2016, and Registered Community Design Application Nos. 003067388-0002, 003067388-0003 and 003067388-0004, filed with the European Union Intellectual Property Office on Apr. 13, 2016, the entire contents of which are incorporated herein by reference in their entirety.

SUMMARY

This disclosure refers to a support (10) for the heating elements of radiant coverings and floors, comprising a base (11) from which bosses develop (12, 13, 14, 15) defining interspaces (16, 17, 18, 19) between them for laying pipes or electric heating cables, which is characterised by the fact that each of these bosses has a concave portion (20), with concavity facing outwards in a laying position, on the surface (21) of said concave portion (20) as at least one adhering low relief is defined (22, 23, 24, 25), in turn defining an anti-extraction undercut (22b) to be filled with material for laying a covering element.

DESCRIPTION

This disclosure relates to a support for the heating elements of radiant coverings and floors.

Nowadays are known and widespread support structures for the heating elements of radiant coverings and floors, with hydraulic or electric type heating elements, generally comprising a base, often consisting of a panel or sheet or flexible thermoplastic membrane, from which an ordered array of bosses develop defining between them interspaces for laying heating pipes or electric cables.

The bosses have perimeter walls with anti-extraction template for the interlocking of a pipe or cable in the space between the two adjacent bosses.

The bosses, usually in a single body with base, have a cavity, open towards the outside in position for use, intended to be filled with adhesive material used for laying the overlying tiles or natural stones.

Said bosses with cavity, although widespread and appreciated, have an important limit due to the fact that the adhesive, once dried, mechanically adheres in the interspaces between the bosses thanks to the undercut portions defined by the anti-extraction template of the bosses' walls, whereas the gripping inside their cavities is milder because such cavities are concave and there are no parts where the dry adhesive can be laid taking an anti-extraction shape with mechanical gripping.

Another known limit of these panels and membranes is constituted by the fact that the base from which the bosses develop is generally a flat sheet, below which is trapped the steam which the heat developed from the radiant elements lets out from the underlying screed; the trapped steam can generate swelling and areas with risk of detaching for the panel with bosses and for the overlying covering.

The task of this disclosure is to create a support for heating elements for radiant coverings and floors able to obviate the limits of the known panels and membranes.

Within this task, an aim of the disclosure is to set-up a support suitable for mechanical adhesion with the material for laying covering with respect to the known panels and membranes.

Another aim of the disclosure is that to set-up a support which cooperates in preventing the formation of bulges between the support itself and the underlying screed, due to the evaporated and trapped steam.

A further aim of the disclosure is that to set-up a support which can be used for the construction of radiant coverings and floors in the same way of the known support panels.

This task, as well as these and other aims hereinafter, are achieved by a support for the heating elements of radiant coverings and floors, according to declaration 1.

BRIEF DESCRIPTION OF THE DRAWINGS

Further characteristics and advantages of the disclosure will be clearer from the description of three forms of preferred executions, but not exclusive, of the support according to the disclosure, illustrated as an example but not limited to, in the attached drawings, in which.

DETAILED DESCRIPTION

With reference to the above figures, a support according to the disclosure is generally indicated in embodiments, with the number 10.

Figure 1:
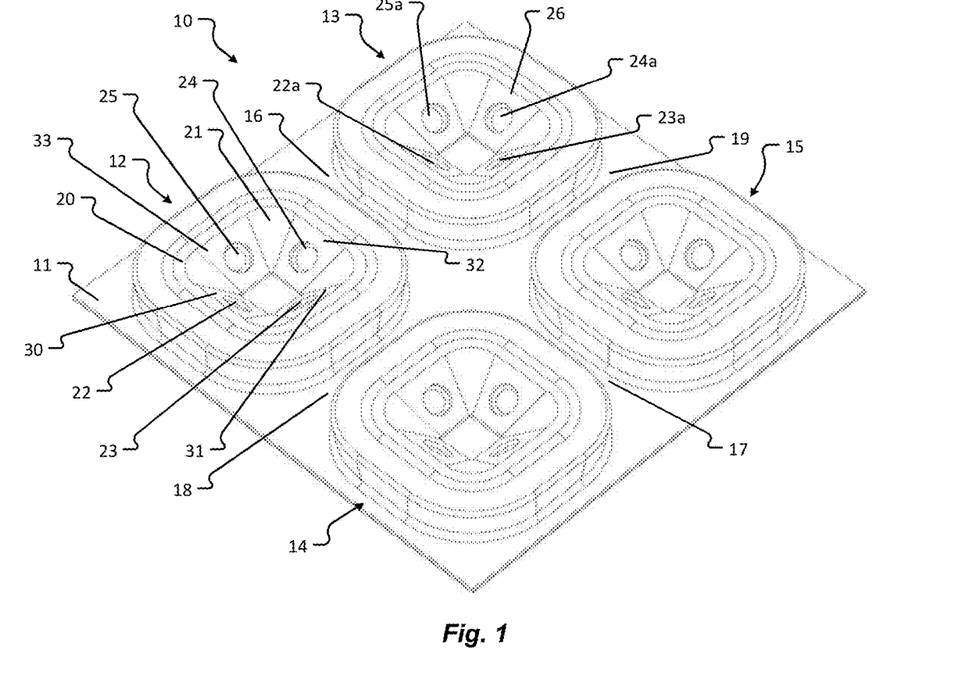
FIG. 1 shows a perspective view of a portion of a support according to the disclosure in its first embodiment.

This support 10 for heating element of radiant coverings and floors includes a base 11 from which the bosses develop, for example 12, 13, 14, 15 in FIG. 1, for example, but not exclusively, arranged according to an ordered array, defining interspaces 16, 17, 18, 19 between them for laying pipes or electric heating cables, the latter not shown for simplicity.

In some embodiments, base 11 is flat or substantially planar.

Base 11 and bosses 12, 13, 14 and 15 may be formed as a single plastic body and a polypropylene or polyethylene membrane (or of other thermoplastic material) which allows venting the steam from an underlying support surface on which it is laid and at the same time may be waterproof, that is the membrane helps prevent the passage of water towards the same support surface. The base 11 and bosses 12, 13, 14, and 15 may also be formed as a plastic panel.

Figure 2:
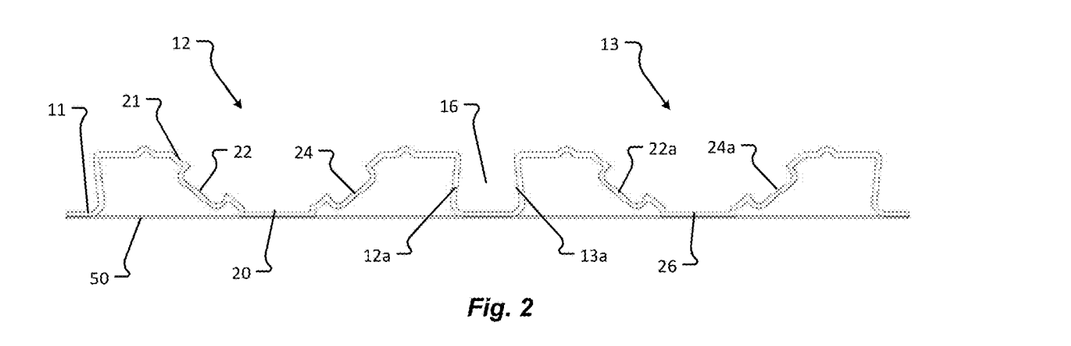
FIG. 2 represents a cross-section of a support according to the disclosure in FIG. 1.

In some embodiments, the bosses have perimeter walls, for example 12a and 13a in FIG. 2, with an anti-extraction template for the interlocking of a heating cable in interspace 16 between two adjacent bosses, for example bosses 12 and 13.

One aspect of the present disclosure resides in the fact that each of said bosses 12, 13, 14 and 15 are provided with a concave portion, for example portion 20 for the first boss 12 and portion 26 for the second boss 13, with the concavity facing the outside in a laying position (e.g., facing upward and away from a floor on which the base 11 is resting).

Defined on the surface 21 of said concave portion 20 is at least one adhering low relief, for example four adhering low reliefs 22, 23, 24, 25 may be provided per concave portion 20. Some or all of the bosses 12, 13, 14, and 15 may be provided with respective concave portions 20 having a number of low reliefs. For instance, boss 13 is shown to include reliefs 22a, 23a, 24a, and 25a.

Figure 2A:
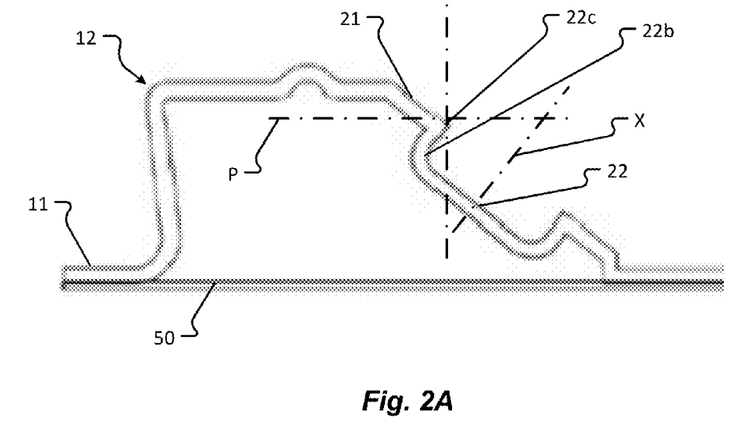
FIG. 2a represents a detail of FIG. 2.

Each of these adhering low reliefs 22, 23, 24 and 25 defines, in turn, an anti-extraction undercut, for example 22b detailed in FIG. 2a, to be filled with material for laying a coating element (e.g., a tile adhesive material) which fills the same concave portion 20 and 26 as well as the interspaces 16, 17, 18, and 19.

The anti-extraction undercut 22b is to be understood such with respect to a plane P parallel to base 11 and passing through an upper point 22c of the outer edge of the corresponding low relief 22.

Said anti-extraction undercut 22b prevents the extraction of the filling material, which fills concave portion 20, and also fills the low relief 22, in a Y direction orthogonal to plane P, thus improving the adhesion of the same material, and of the overlying covering, to support 10.

The low reliefs of the second boss 12 are shown, as an example, with 22a, 23a and 24a.

In the embodiment of FIGS. 1 and 2, each adhering low relief 22, 23, 24, 25 is cylindrical with the main X axis orthogonal to surface 21 of the corresponding concave portion 20, with rounded inner corners to help the extraction of the equipment with which the bosses are moulded on the base.

Figure 4:
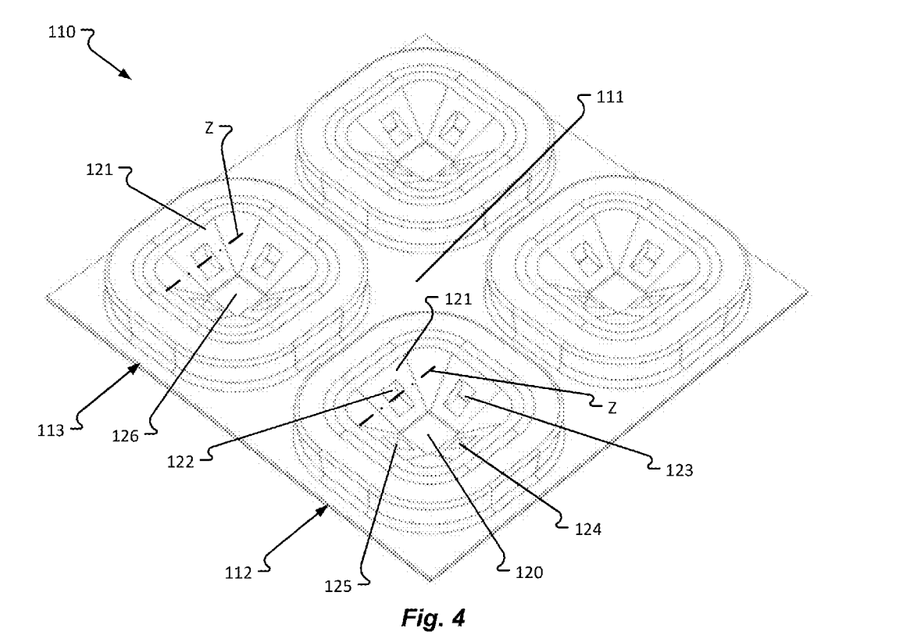
FIG. 4 shows a perspective view of a portion of a support according to the disclosure in its second embodiment.
Figure 5:
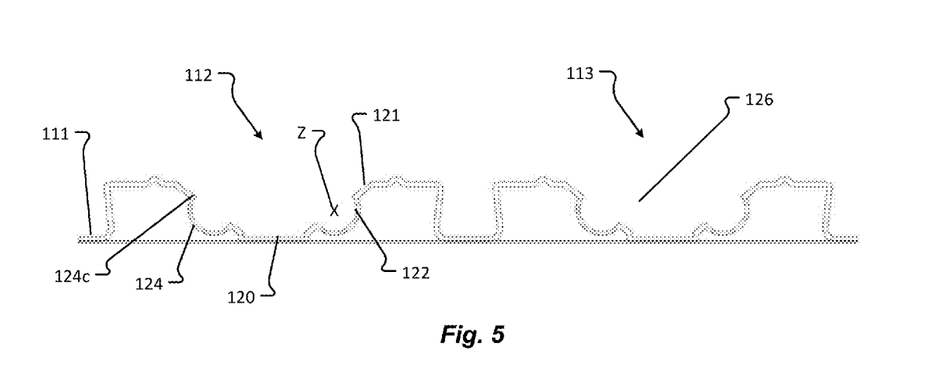
FIG. 5 represents a crossway section of a support as per FIG. 4.

In another embodiment, indicated with 110 and represented in FIGS. 4 and 5, for each boss 112 and 113 each adhering low relief 122, 123, 124, 125 has a semicylindrical template in cross-section, with main axis Z parallel to surface 121 of the concave portion 120.

Figure 5A:
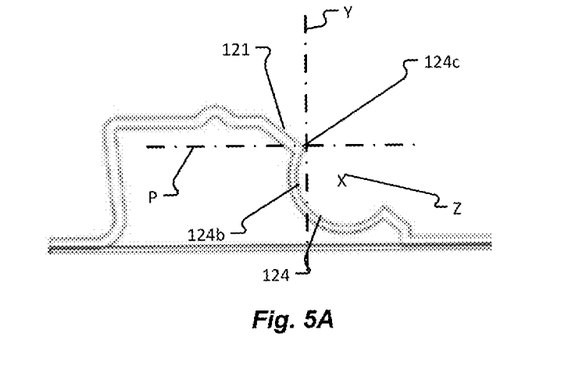
FIG. 5a represents a detail of FIG. 5.

Each of these adhering low reliefs 122, 123, 124 and 125 defines in turn an anti-extraction undercut, for example 124b detailed in FIG. 5a, to be filled with material for laying a coating element (e.g., a tile adhesive material) which fills the same concave portion 120 and 126 as well as the interspaces.

The anti-extraction undercut 124b is to be understood such with respect to a plane P parallel to base 111 and passing through the upper outer edge 124c of the corresponding low relief 124.

This anti-extraction undercut 124b prevents the extraction of the filling material, which fills the concave portion 120, thus also the low relief 124, in a Y direction orthogonal to plane P.

These adhering low reliefs can also have other shapes (e.g., in cross-section or in other dimensions), for example with a semispherical, triangular, square, rhomboidal, oval section and other shapes, templates and profiles, depending on the technical needs and requirements.

In these example embodiments, not restrictive of the disclosure, each concavity has a truncated conical shaped surface 21, with walls 30, 31, 32, 33 connected by curved sections.

Figure 3:
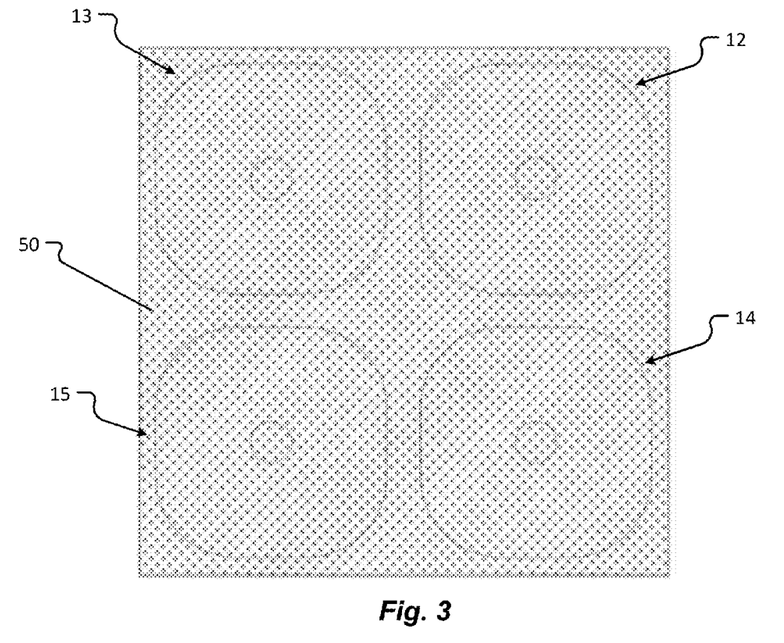
FIG. 3 represents a bottom view of the portion of FIG. 1.

Support 10 includes at least one low relief 22, 23, 24, 25 for each of the said walls 30, 31, 32, 33, for example one low relief for each wall, as in FIGS. 1 and 3.

Figure 6:
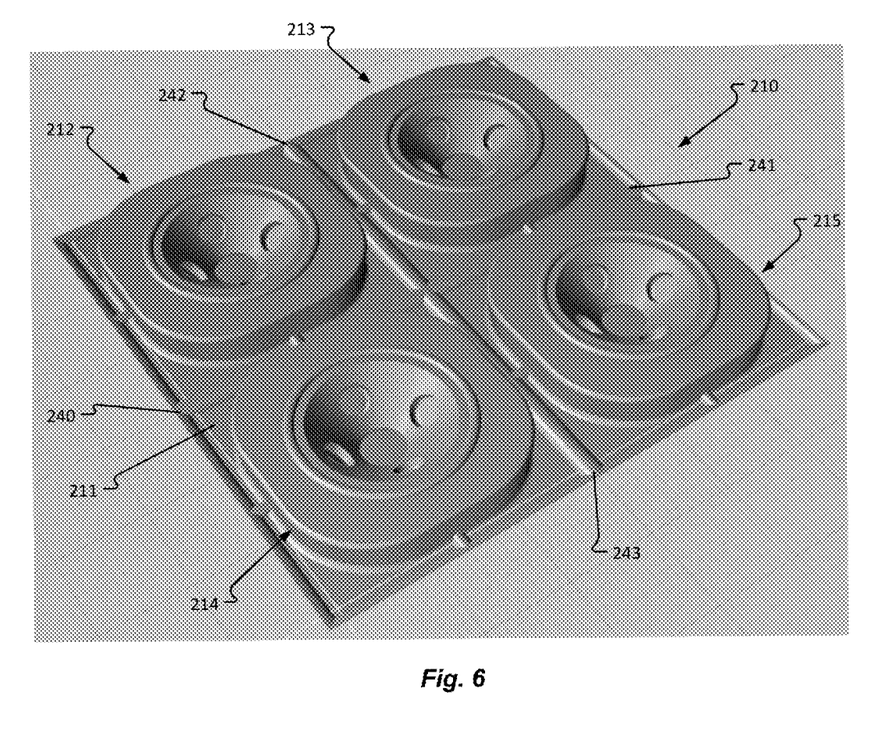
FIG. 6 represents a perspective view of a portion of a support according to the disclosure in its third embodiment.
Figure 7:
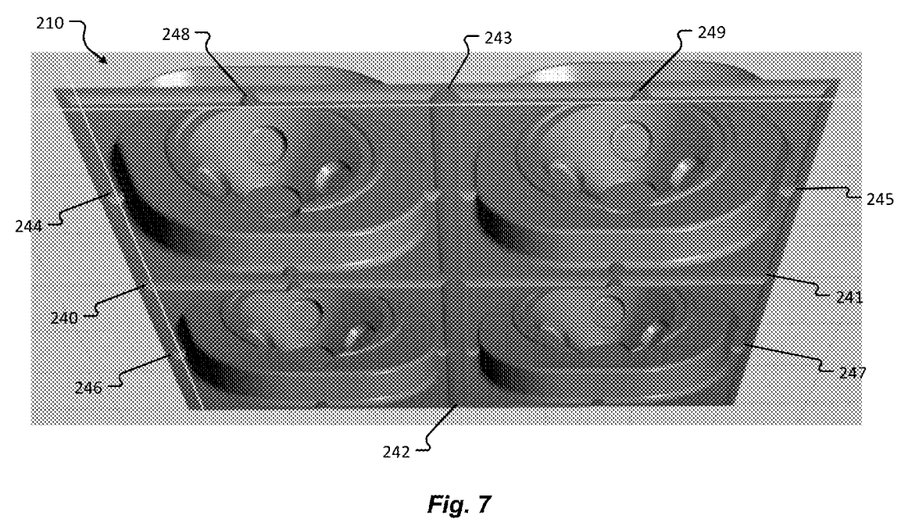
FIG. 7 represents an additional perspective view of a portion of a support according to the disclosure in its third embodiment.
Figure 8:
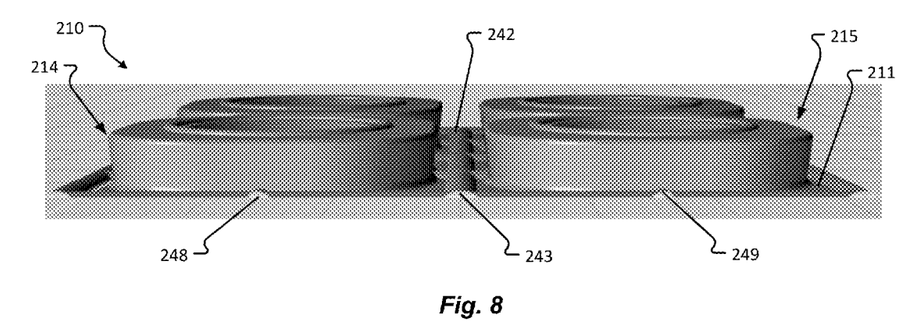
FIG. 8 represents a side view of the support portion of FIG. 6.

In another embodiment of the disclosure, clearly visible in figures from 6 to 8 and indicated therein with number 210, in correspondence of said interspaces, on said base 211, are channels 240, 241, 242, 243 to convey the steam towards the collection chambers 244, 245 defined between the body of said bosses 212, 213, 214, 215 and an underlying surface, such as the screed, an adhesive layer or another layer fixed to base 211 of the same support 210.

These channels 240, 241, 242, 243 are open towards the surface to which support 210 is fixed and communicate with the collection chambers 244 and 245 through corresponding passages, such as 246, 247, 248 and 249 in FIGS. 7 and 8.

Thanks to the bosses having flat and/or walls and the chambers 244 and 245 defined inside each boss, and to the conveying channels, it is possible to collect at least part of the steam possibly coming out from the screed due to the heat given off by the heating elements laid on support 210, and avoid that this steam determines the formation of bulging areas and the detachment of the same support 210 from the underlying screed or other support surface and fixing.

The support according to the disclosure, in its three embodiments above 10, 110 and 210, may also include a thermal insulation layer 50 located under the base 11, 111, 211 and developed to involve the entire base 11, 111, 211 including the areas in which said bosses 12, 13, 14, 15, 112, 113, 212, 213, 214, 215 develop.

Said thermal insulation layer 50 may be made of fabric or cork or a metal sheet or other similar and equivalent materials.

Basically, it has been ascertained how the disclosures achieves the intended task and purposes.

In particular, with the disclosure we have developed a support which is optimal for mechanical adhesion with the adhesive material for laying the coverings with respect to the known panels.

In addition, with the disclosure a support has been set-up which cooperates in preventing the formation of bulges between the support and the underlying screed, due to the evaporated and trapped steam.

Furthermore, with the disclosure we have developed a support which is simple and intuitive to use.

In addition, with the disclosure we have developed a support that can be used for the realization of radiant floors in the same way as the known support structures.

The disclosure, thus conceived, is susceptible of various changes and variations, all falling within the inventive concept; moreover, all details can be replaced with others technically equivalent.

Basically, the used components and materials, as long as compatible with the specific use, as well as the contingent shapes and dimensions, can be any according to the requirements and state of the art.

Where the features and techniques mentioned in any claim are followed by benchmarks, these marks are affixed with the sole purpose of increasing the intelligibility of the claims and such benchmarks have no limiting effect on the interpretation of each element identified by way of example by such benchmarks.

The invention claimed is:

1. A radiant heating system, comprising:
   a base; and
   a plurality of bosses extending from the base, the plurality of bosses arranged to have a plurality of interspaces provided therebetween that receive pipes or electrical cables for heating, wherein at least one of the plurality of bosses comprises a concave surface defining a substantially frustoconical shape and facing away from the base, the concave surface having thereon at least one adhering low relief on a side of the substantially frustoconical shape that creates an extraction-preventing undercut on the concave surface,
wherein the concave surface and the at least one adhering low relief define a continuous surface.

2. The radiant heating system of claim 1, wherein the at least one adhering low relief comprises a cylindrical shape.

3. The radiant heating system of claim 1, wherein the at least one adhering low relief comprises a semicylindrical shape in cross-section.

4. The radiant heating system of claim 1, wherein the at least one adhering low relief has an inner perimeter adjacent the concave surface that is greater than or equal to any inner perimeter of the adhering low relief that is offset from the concave surface.

5. The radiant heating system of claim 1, wherein the at least one of the plurality of bosses comprises at least four adhering low reliefs.

6. The radiant heating system of claim 1, wherein the plurality of interspaces comprise channels that convey steam toward collection chambers.

7. The radiant heating system of claim 6, wherein the collection chambers are formed between the plurality of bosses and the base.

8. The radiant heating system of claim 1, further comprising:
a thermal insulation membrane positioned on a first surface of the base that opposes a second surface of the base on which the plurality of bosses are provided.

9. The radiant heating system of claim 8, wherein the thermal insulation membrane comprises at least one of fabric, cork, and a sheet of metallic material.

10. The radiant heating system of claim 1, wherein the base and the plurality of bosses are formed from a single piece of material.

11. The radiant heating system of claim 10, wherein the single piece of material comprises plastic.

12. A support for heating elements of floors and of radiation claddings, the support comprising:
a base comprising a first surface and an opposing second surface;
a thermal insulation element positioned adjacent to the first surface of the base; and
a plurality of bosses extending from the second surface of the base, the plurality of bosses arranged to have a plurality of interspaces provided therebetween that receive pipes or electrical cables for heating, wherein at least one of the plurality of bosses comprises a concave surface defining a substantially frustoconical shape and facing away from the base, the concave surface having thereon at least one adhering low relief that creates an extraction-preventing undercut on the concave surface, wherein the concave surface and the at least one adhering low relief define a continuous surface.

13. The support of claim 12, wherein the insulation membrane comprises at least one of fabric, cork, and a sheet of a metallic material.

14. The support of claim 12, wherein the at least one adhering low relief comprises a cylindrical shape.

15. The support of claim 12, wherein the at least one adhering low relief comprises a semicylindrical shape in cross-section.

16. The support of claim 12, wherein the at least one adhering low relief has an inner perimeter adjacent the concave surface that is greater than or equal to any inner perimeter of the adhering low relief that is offset from the concave surface.

17. The support of claim 12, wherein the at least one of the plurality of bosses comprises at least four adhering low reliefs.

18. The support of claim 12, wherein the plurality of interspaces comprise channels that convey steam toward collection chambers.

19. The support of claim 18, wherein the collection chambers are formed between the plurality of bosses and the base.

20. A support designed for use in a radiant heating system of a floor, the support comprising:
a base comprising a first surface and an opposing second surface;
a thermal insulation element positioned adjacent to the first surface of the base, the thermal insulation element comprising at least one of fabric, cork, and a sheet of a metallic material; and
a plurality of bosses extending from the second surface of the base, the plurality of bosses arranged to have a plurality of interspaces provided therebetween, wherein at least one of the plurality of bosses comprises a concave surface defining a substantially frustoconical surface and facing away from the base, the concave surface having thereon at least one adhering low relief that creates an extraction-preventing undercut on the concave surface, wherein the concave surface and the at least one adhering low relief define a continuous surface.

* * * * *